(12) United States Patent
Penke et al.

(10) Patent No.: US 9,848,247 B2
(45) Date of Patent: Dec. 19, 2017

(54) MEDIA COMPUTING DEVICE WITH MULTIPLE VIRTUAL SCREENS AND PERSONAL AREA NETWORK CAPABILITY

(71) Applicant: Blackfire Research Corporation, San Francisco, CA (US)

(72) Inventors: Ramachandra Penke, Fremont, CA (US); Rohit Verma, San Francisco, CA (US); Jace Martin, Oakland, CA (US); Ravi Rajapakse, San Francisco, CA (US)

(73) Assignee: Blackfire Research Corporation, San Francisco, CA (US)

( * ) Notice: Subject to any disclaimer, the term of this patent is extended or adjusted under 35 U.S.C. 154(b) by 7 days.

(21) Appl. No.: 15/178,544

(22) Filed: Jun. 9, 2016

(65) Prior Publication Data

US 2017/0318352 A1 Nov. 2, 2017

Related U.S. Application Data

(60) Provisional application No. 62/328,562, filed on Apr. 27, 2016.

(51) Int. Cl.
| | |
|---|---|
| *H04N 21/00* | (2011.01) |
| *H04N 21/61* | (2011.01) |
| *H04W 4/00* | (2009.01) |
| *H04N 21/4363* | (2011.01) |
| *H04N 21/41* | (2011.01) |
| *H04W 84/18* | (2009.01) |
| *H04W 88/02* | (2009.01) |
| *H04N 21/414* | (2011.01) |

(52) U.S. Cl.
CPC ..... *H04N 21/6125* (2013.01); *H04N 21/4122* (2013.01); *H04N 21/43635* (2013.01); *H04N 21/43637* (2013.01); *H04W 4/008* (2013.01); *H04N 21/4126* (2013.01); *H04N 21/41415* (2013.01); *H04W 84/18* (2013.01); *H04W 88/02* (2013.01)

(58) Field of Classification Search
CPC ..................... H04N 21/4126; H04N 21/41415
See application file for complete search history.

(56) References Cited

U.S. PATENT DOCUMENTS

| 2008/0227500 A1* | 9/2008 | Heyworth .......... G06Q 30/0267 455/566 |
| 2010/0211874 A1 | 8/2010 | Weiss |
| 2010/0250761 A1 | 9/2010 | Hird et al. |
| 2012/0078720 A1* | 3/2012 | Pappas ..................... G06F 8/38 705/14.55 |

(Continued)

*Primary Examiner* — Zachary K Huson
(74) *Attorney, Agent, or Firm* — Galvin Patent Law LLC; Brian R. Galvin

(57) ABSTRACT

A media computing device with multiple virtual screens and personal area network capability, comprising a processor, a memory, an HDMI controller operating an HDMI interface, a wireless network interface configured to communicate via a local area network and configured to communicate via a personal area network, a media management subsystem, a virtual screen driver; and an operating system comprising programming instructions stored in the memory of and operating on the processor and configured to operate multiple virtual screens for user interaction via devices communicating via a network.

11 Claims, 10 Drawing Sheets

(56) References Cited

U.S. PATENT DOCUMENTS

| | | | |
|---|---|---|---|
| 2015/0200985 A1 | 7/2015 | Feldman et al. | |
| 2015/0208026 A1* | 7/2015 | Lai | H04N 21/4183 348/441 |
| 2016/0080549 A1* | 3/2016 | Yuan | H04M 1/72533 455/420 |
| 2016/0187862 A1* | 6/2016 | Nayak | H04N 21/41407 700/275 |

* cited by examiner

MEDIA COMPUTING DEVICE WITH MULTIPLE VIRTUAL SCREENS AND PERSONAL AREA NETWORK CAPABILITY

CROSS-REFERENCE TO RELATED APPLICATIONS

This application claims priority to U.S. provisional patent application Ser. No. 62/328,562, titled "MEDIA COMPUTING DEVICE WITH MULTIPLE VIRTUAL SCREENS" filed on Apr. 27, 2016, the entire specification of which is incorporated herein by reference in its entirety.

BACKGROUND OF THE INVENTION

Field of the Art

The disclosure relates to the field of computing devices, and more particularly to the field of media computing devices.

Discussion of the State of the Art

Streaming multimedia devices such as ROKU™ or CHROMECAST™ are often used to play media to a television or other external display with minimal hardware and software features, as a dedicated media consumption device for home use. More advanced functions such as gaming or other software applications as may be commonplace in other computing devices, are not generally possible or when possible, they "take over" the television as the primary display and interrupt media consumption.

What is needed, is a means to stream media to an external display device while allowing OS and application interaction via a remote, shared screen accessible via a user's mobile device.

SUMMARY OF THE INVENTION

Accordingly, the inventor has conceived and reduced to practice, in a preferred embodiment of the invention, a media computing device with multiple virtual screens and personal area network capability. The following non-limiting summary of the invention is provided for clarity, and should be construed consistently with embodiments described in the detailed description below.

To address the problem of providing a means to stream media to an external display device while allowing wireless operating system ("OS") and application interaction by one or more users of mobile electronic devices, the inventors conceived and reduced to practice a device that may be inserted into a standard high-definition media interface ("HDMI") socket of a television, or into a similar media interface such as DisplayPort or other media adapter port in a television or similar media device. The media computing device has a complete operating system such as ANDROID™, IOS™, LINUX™, or WINDOWS™. It is equipped with one or more wireless network interface circuits, enabling it to communicate via WiFi with other devices. The device is controlled by users of remote mobile devices such as smart phones or tablets, via WiFi. The media computing device does not necessarily have any built-in user interface, but rather uses a virtual screen driver to provide full operating system user interface screens to users of mobile devices. One or more virtual screens may be operated simultaneously by mobile device users. A mobile device user is presented with a typical operating system home screen or desktop (depending on the operating system), and can interact with the screen using touchscreen capabilities to perform any actions normally available in the operating system. The home screen, virtual screen, or virtual desktop appears within an application on the mobile device, thus providing a "full OS inside an app" modality to the user, with actions taken by the user affecting what appears on a television.

Thus, rather than a basic remote control device that allows a user to navigate among a small set of fixed selections (such as by up/down/left/right buttons moving around a set of icons on a television screen, and a select button to choose a highlighted option), the user has the full range of OS interaction capabilities. For example, a user could browse an app store provided by an OS vendor, select and download an app, and use the app via its normal user interface (on the mobile device) to control what is sent via HDMI to the television. Thus, from a high level viewpoint, the invention makes it possible, via an HDMI "dongle", to wirelessly provide the full OS functionality of the media computing device to users of mobile devices, allowing them to take advantage of the full capabilities of the OS while using a high-definition television as an HDMI output device.

Examples of how the invention may be used are many. For example, a user may select a movie from a cloud-based service such as NETFLIX™ or AMAZON PRIME™ and direct the video via the HDMI output to a television, while sending the audio wirelessly to a set of speakers to provide a rich audio experience. The user may select how audio is distributed, may select what is to be viewed, and may control viewing settings, all from within a standard OS user interface (including possibly an application retrieved from an app store). In another example, several users may each interact with a game operating on the device. Each user (player) may see the same game screen on their mobile device, or each may see a separate screen. Each player has full interactive functionality within the game on his mobile device. The same, or indeed a different, screen may be shown on the HDMI output device to which the media computing device is connected. For example, a shared screen may be seen on a television, while each player has a private screen for controlling what their character does, with the actions taken by each player on his mobile device simultaneously affecting what is seen on the television.

The delivery of virtual screens to mobile devices from the media computing device may be done by intercepting screen graphics bitmaps (which would normally be sent to a hardware display device for rendering), and transcoding the graphics data into H.264 (for example). The H.264 stream can then be sent in packetized form over a wireless network to each of the mobile devices. Similarly, user interaction events received on the mobile devices (for example, touch-screen interactions) are sent in packetized form over the wireless network to the media computing device, where they are provided to and interpreted by the operating system as if they were user interaction events arriving from an attached touchscreen. In some use modes, each user sees the same OS screen on his mobile device. In one of these modes, each user can simultaneously interact with the OS via his mobile device and the OS uses an interrupt management system (common in operating systems) to ensure that each user's interactions are handled in a timely manner. In another use mode involving a shared virtual screen, only one user at a time has control of the user interface; users could take turns controlling, or users could "seize control" with or without the concurrence of other users (quasi-competitive control of the shared user interface could be part of a game concept).

In another use mode, each user is provided with his own virtual screen. For example, many operating systems provide for multiple virtual desktops, so that a user may use different applications on different desktops. In the use mode envisioned, each user interacts with the operating system using his own logical/virtual desktop, which is provided wirelessly as before.

In some cases, a "safe mode" of interaction is provided to enable continued use of the media computing device when network congestion or degradation occurs. For example, in safe mode users would receive simple, text-based notifications from the media computing device wirelessly, which are presented within an application on his mobile device. The user is provided with a set of control selections more akin in functional richness to those provided by remote controls known in the art, thus allowing users to interact with the media computing device in a way analogous to how users interact with a ROKU™ device today.

According to a preferred embodiment of the invention, a media computing device with multiple virtual screens and personal area network capability, comprising: a processor; a memory; an HDMI controller operating an HDMI interface; a plurality of wireless network interfaces, comprising at least a wireless network interface configured to communicate via a local area network and a wireless network interface configured to communicate via a personal area network; a media management subsystem; a virtual screen driver; an operating system comprising programming instructions stored in the memory of and operating on the processor and configured to: send screen graphics via the virtual screen driver to a plurality of mobile devices; send media content to an HDMI display device via the HDMI controller and the HDMI interface; receive user interaction events from a mobile device via the wireless network interface; and wherein the HDMI interface is physically coupled to an HDMI input port of the HDMI display device, is disclosed.

According to another preferred embodiment of the invention, a portable media computing device is disclosed, comprising: a processor; a memory; a high-definition multimedia interface adapter; a wireless network interface configured to communicate via a wireless network; a media management subsystem; a virtual screen driver; and an operating system comprising programming instructions stored in the memory and operating on the processor and configured to: send screen graphics via the virtual screen driver to a plurality of mobile devices using the wireless network; send media content to a display device via the high-definition multimedia interface adapter; and receive user interaction events from a mobile device via the wireless network interface.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
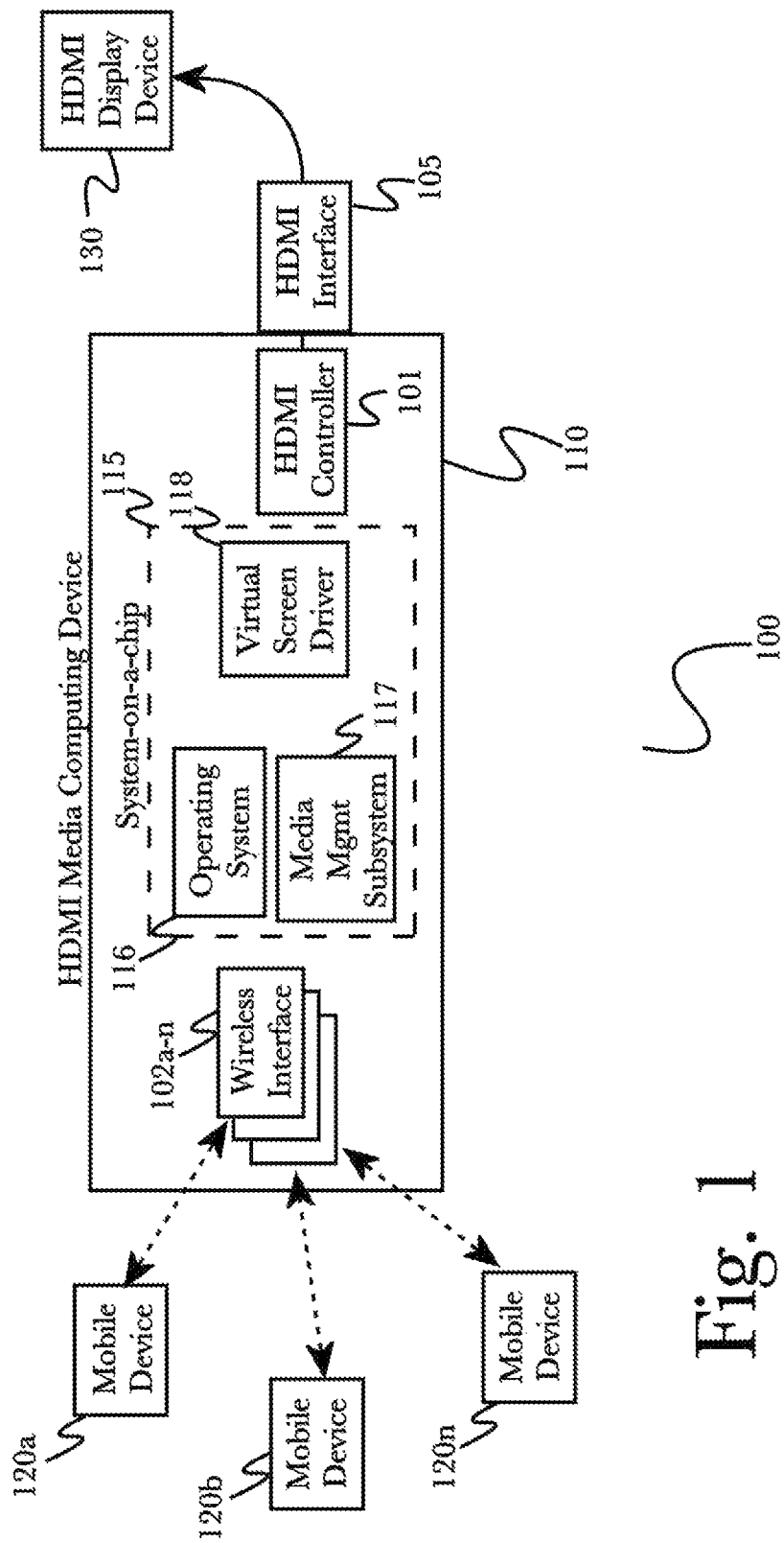
FIG. 1 is a block diagram illustrating an exemplary system architecture for a media computing device with multiple virtual screens and personal area network capability, according to a preferred embodiment of the invention.

The inventor has conceived, and reduced to practice, in a preferred embodiment of the invention, a media computing device with multiple virtual screens and personal area network capability.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for a media computing device with multiple virtual screens and personal area network capability, according to a preferred embodiment of the invention. According to the embodiment, a media computing device 110 may comprise a system-on-a-chip 115 further comprising a memory 11 and a processor 12 (as described below, referring to FIG. 4), configured to operate without integral hardware display or input devices (such as, for example, a computer monitor or keyboard as are commonly present in computing devices), and configured to operate a software operating system 116, for example including (but not limited to) ANDROID™, APPLE IOS™, WINDOWS™, and various forms of LINUX™. OS 116 may comprise a media management subsystem 117 that provides media content for viewing via an HDMI display device 130 connected via HDMI interface 105 and controlled by HDMI controller 101, such as a television or computer monitor, and a virtual screen driver 118 that may operate a plurality of virtual (logical) interactive software interfaces ("virtual screens") and may present at least a portion of these screens for interaction via a plurality of mobile devices 120a-n communicating via a plurality of wireless network interfaces 102a-n. Operating system 116 may generally have a "home screen" or similar primary environment that may be used by a user to interact with various hardware or software features and functions of the media computing device 110. Alternatively, OS 116 may provide a plurality of logical desktops or other virtual screens to users via mobile devices 120a-n. To facilitate user interaction, virtual screen driver 118 may listen for connections via a network or physical connection from a plurality of mobile devices 120a-n (such as, for example including but not limited to, a tablet computing device or smartphone), and may present a virtual screen to a device after connecting. A user may then interact with his mobile device normally using whatever means are available according to the particular configuration of the mobile device, and this interaction may be provided to virtual screen driver 118 for translation and delivery to OS 116. In this manner, media may be presented on an external display device 130 such as a high-definition television (the device of the invention typically being inserted into an HDMI port of the television, and controlling the television using HDMI interface 105), while users interact with an operating system via virtual screen driver 118, allowing users to interact with software applications. This allows users to perform actions such as installing programs, playing games, modifying media playback configurations, selecting media for presenting to external display device 130, or performing administrative tasks.

It should be noted that, while HDMI is used in the example of FIG. 1 and is discussed throughout, other similar media interfaces may be used in place of HDMI, according to the invention. For example, DISPLAYPORT™ interfaces may be used; in such embodiments, HDMI controller 101 and HDMI interface 105 would be instead a DISPLAYPORT™ controller 101 and a DISPLAYPORT™ interface 105; similarly, other newly emerging high-definition media interfaces may be used in various embodiments of the invention.

According to various alternative arrangements, virtual screen driver 118 may connect via physical connections such as a USB cable (or other cable connections), for example to connect to a mobile device 120a-n with particular hardware capabilities, such as a personal computing device that may have a USB port but no active network connection. Wireless network interface 102a-n may use a variety of different technologies or protocols, such as using various frequency bands or channels for WiFi connectivity, BLUETOOTH™, cellular radios, or other network connection types, to connect mobile devices 120a-n to media computing device 110.

Virtual screen driver 118 may operate multiple connections for multiple mobile devices 120a-n, for example so that more than one user may interact with the operating system of media computing device 110. According to various arrangements, each mobile device 120a-n may be presented a separate "instance", or copy, of an operating system home screen or other virtual screen, so that each user may have access to the operating system for interaction without being affected by the activities of other users that may be connected. In some arrangements, user access may be restricted such as to provide read-only access to some portions of an operating system, or to restrict software applications or functions based on configured criteria such as mobile device or connection type, or using stored software-based whitelisting or blacklisting behavior. In other arrangements, multiple mobile devices 120a-n may be presented with the same instance of a home screen, so that multiple users may interact collaboratively such as to work together while editing stored files, or to interact with a shared screen in a gaming application, or other shared-use cases. When multiple users are connected to a single virtual screen driver 118, congestion may be managed by operating a "safe mode" or minimal interface for new users, such as when system resources are limited or after a set number of concurrent users has been reached (for example, providing a full interface to the first four users and a stripped-down interface to any users after that). For example, a new user connecting may be presented with a notification that the maximum number of connections has been reached, or that resources are limited, and be prompted to abort or continue with limited functionality. A limited interface may comprise, for example, basic remote control functionality to direct the operation of media management subsystem 117 remotely, for example features such as "next track", "play/pause", or volume controls. In this manner, additional users may still be able to control media being viewed on display device 130, without requiring full OS interaction.

Figure 2:
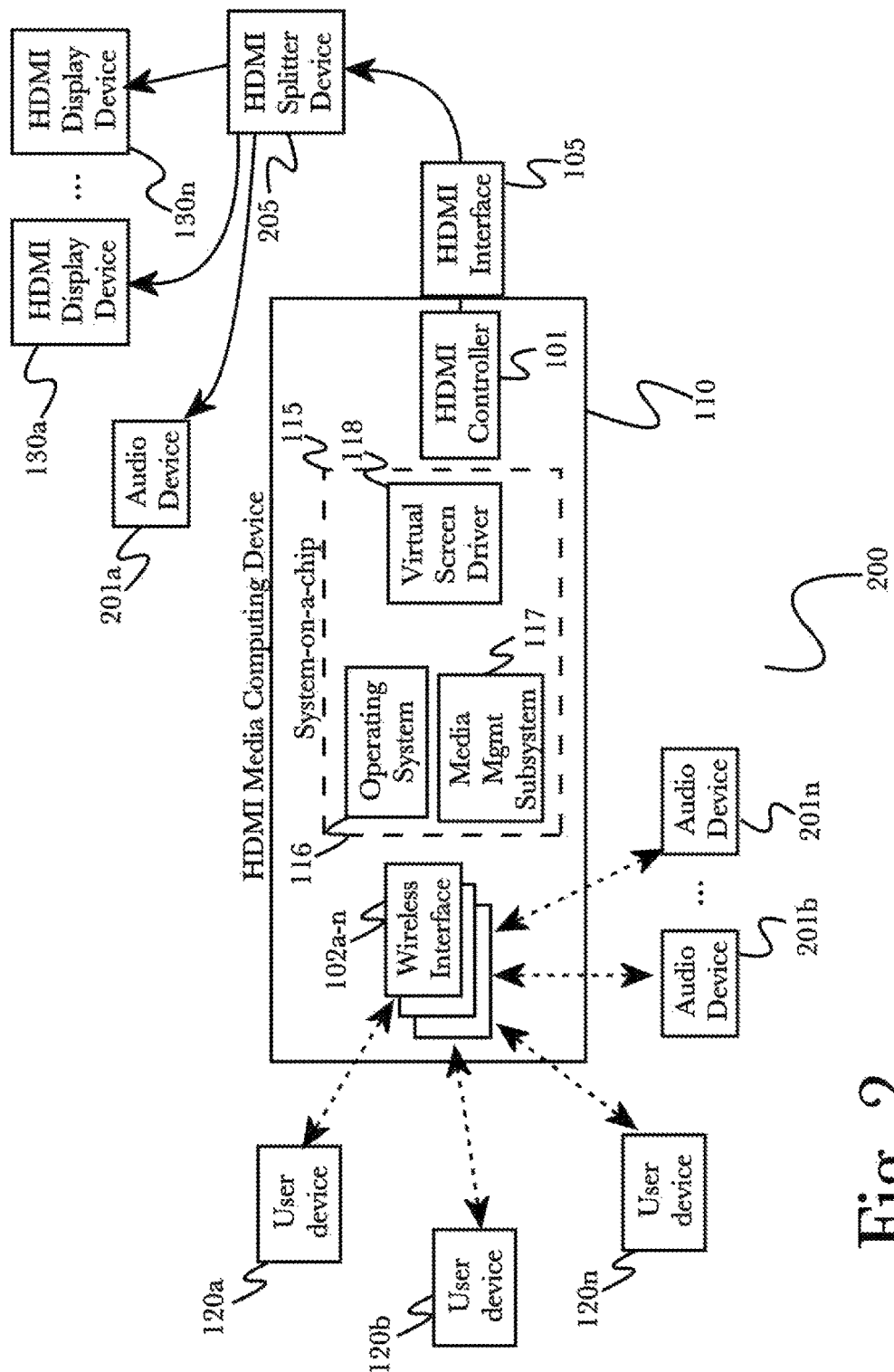
FIG. 2 is a block diagram illustrating an alternate exemplary system architecture for a media computing device with multiple virtual screens, according to a preferred embodiment of the invention.

FIG. 2 is a block diagram illustrating an alternate exemplary system architecture 200 for a media computing device with multiple virtual screens, according to a preferred embodiment of the invention. According to the embodiment, a media management subsystem 117 operating on a media computing device 110 may connect to multiple destination devices including (for example) a plurality of HDMI display devices 130a-n such as a computer monitor or television, or a plurality of audio devices 201a-n, such as speakers connected via physical connections such as SP/DIF optical audio cables, or connected via network connections such as WiFi or BLUETOOTH™. Multiple HDMI output devices may be used via an HDMI splitter 205, which enables a single HDMI output from HDMI interface 105 to be sent to multiple HDMI devices, each of which may use some or all of the media content sent from HDMI controller 101 via HDMI interface 105 and HDMI splitter 205. For example, a multi-speaker home theater setup may be connected to a single media management subsystem 117, which may then broadcast media in a multicast fashion to some or all connected devices according to various arrangements. In this manner, it may be appreciated that a media computing device 110 may be fully compatible with a wide variety of device arrangements and hardware capabilities, and may easily integrate into any existing media configuration.

Figure 8:
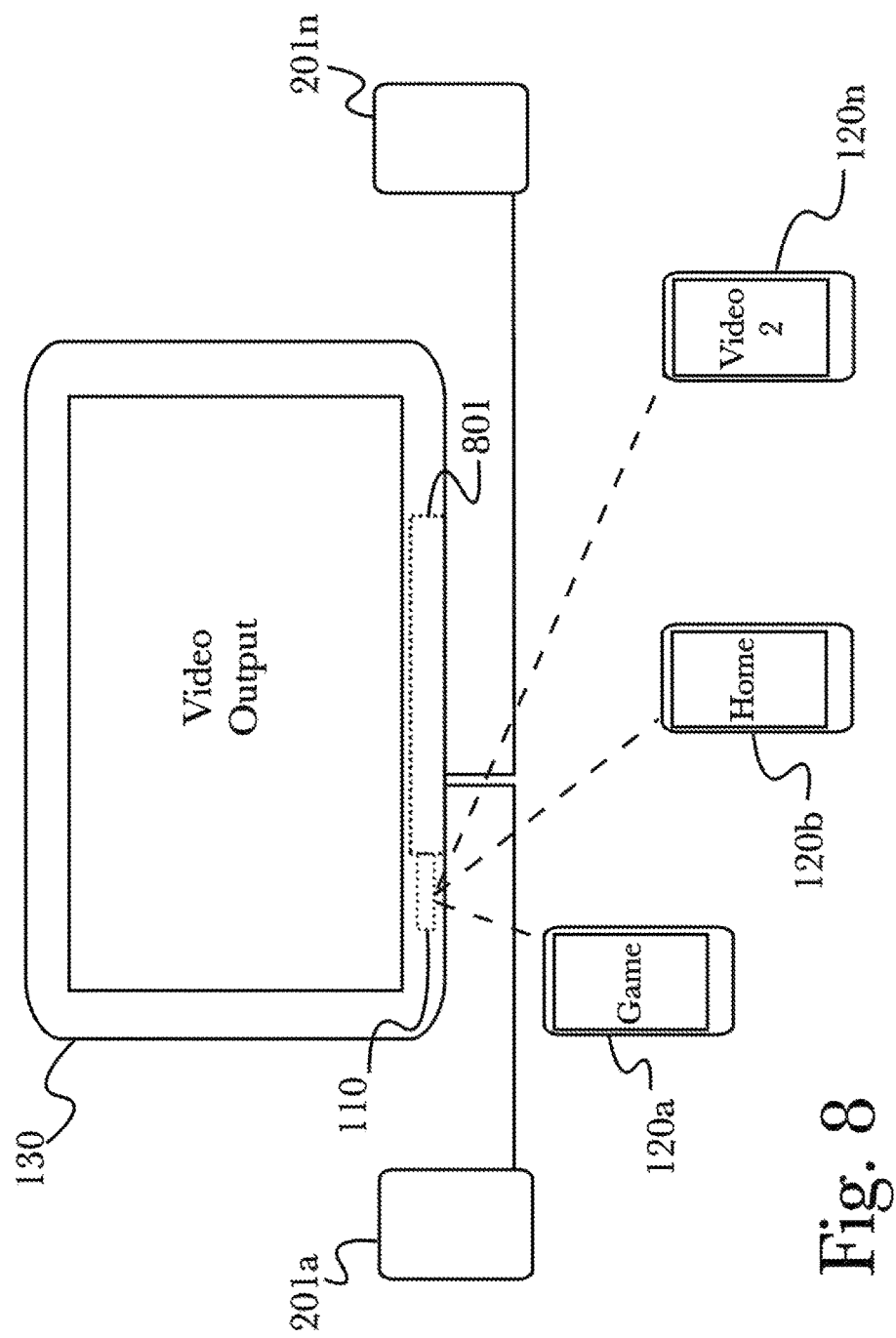
FIG. 8 is an illustration of an exemplary device arrangement utilizing a media computing device with multiple virtual screens and personal area network capability, illustrating the connection the media computing device to a television and speakers, and wireless presentation of multiple virtual screens to mobile devices.

FIG. 8 is an illustration of an exemplary device arrangement utilizing a media computing device with multiple virtual screens and personal area network capability, illustrating the connection the media computing device 110 to a television 130 and speakers 201a-n, and wireless presentation of multiple virtual screens to mobile devices 120a-n. According to the embodiment, a media computing device 110 may be connected to an appropriate hardware port (for example, an HDMI video port) on the back 801 connection panel of a television 130 or similar video device (for example, in some arrangements a computer display monitor, projector, or other video device may be used). When connected in this fashion, media computing device 110 may also draw power for operation from television 130, removing the need for any additional cables or connections. television 130 may also be connected to a plurality of external hardware speakers 201a-n, as is common in home media arrangements where the television 130 displays video content and speakers 201a-n are used to playback corresponding audio content during viewing. Media computing device 110 may be further connected via wireless network connections (using wireless network interfaces 102a-n, as described above with reference to FIG. 1) to a plurality of user mobile devices 120a-n, for example a plurality of smartphone devices as shown (however it should be appreciated that various types of device may be used, for example tablet computing devices or laptop personal computers, or any other device capable of communicating with media computing device 110 via a wireless network connection). While connected in this manner, media computing device 110 may present a plurality of different virtual screens to mobile devices 120a-n using a virtual screen driver 118, for example so that different users may interact with media computing device 110 independently. For example, one user may play a video game on their mobile device 120a, while another user is viewing a home screen (or other form of primary or root environment for an operating system operating on media computing device 110, as described previously with reference to FIG. 1) on their device 120b, while a third user may be viewing video or other media content on their device 120n. While users are viewing and interacting via their respective virtual screens in this manner, media computing device 110 may continue displaying video content via the connected television 130 and playing audio via speakers 201a-n, so that media playback may continue uninterrupted regardless of user interaction and operations via their respective virtual screens.

Figure 9:
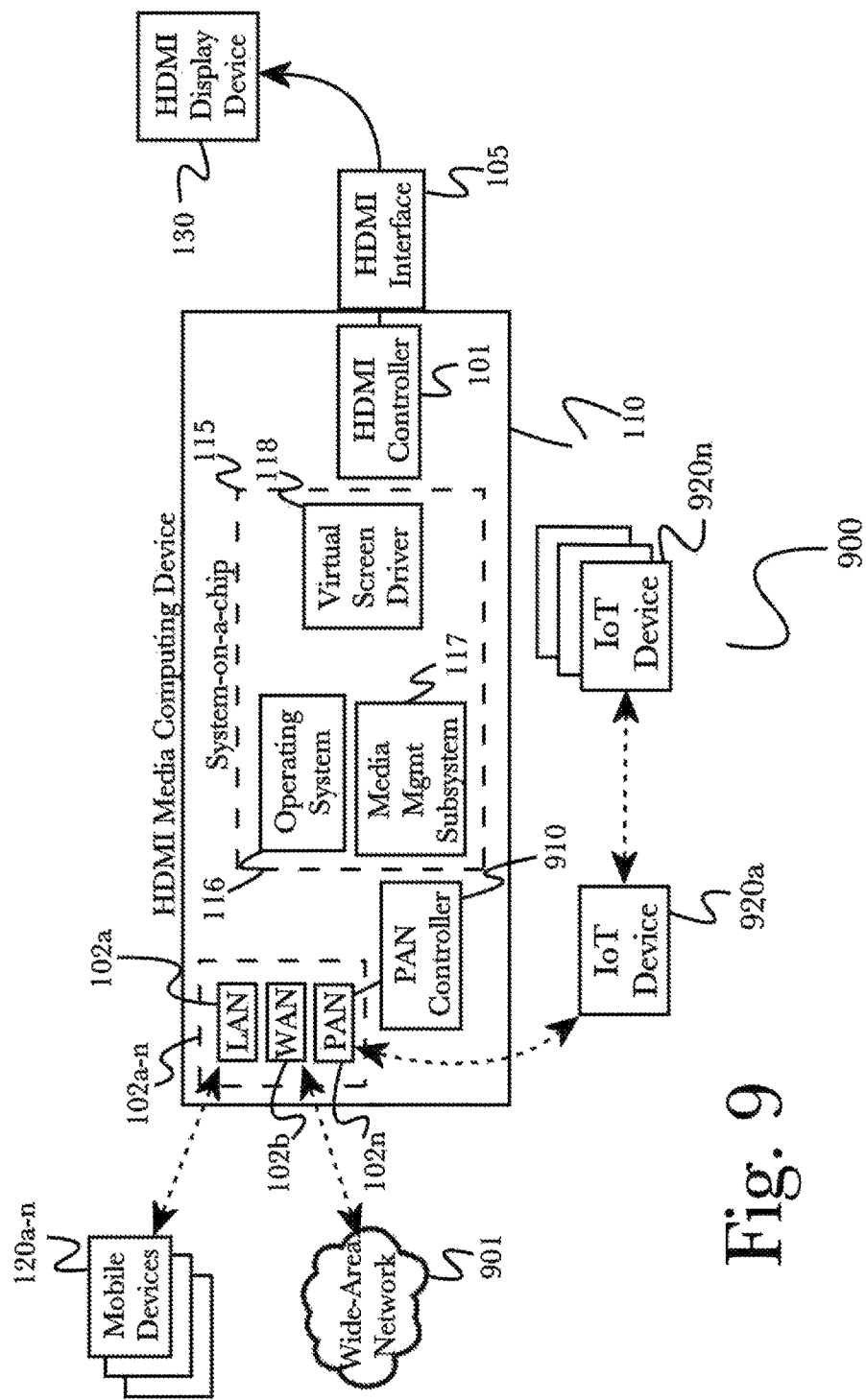
FIG. 9 is a block diagram illustrating an alternate exemplary system architecture for a media computing device with multiple virtual screens and personal area network capability, illustrating the use of a PAN controller to function as a home automation hub according to a preferred embodiment of the invention.

FIG. 9 is a block diagram illustrating an alternate exemplary system architecture for a media computing device with multiple virtual screens and personal area network capability, illustrating the use of a PAN controller 910 to function as a home automation hub according to a preferred embodiment of the invention.

According to the embodiment, wireless interfaces 102a-n may comprise a variety of wireless networking or direct-communication protocols or technologies, for example including a local area network (LAN) interface 102a, BLUETOOTH™ interface 102b, wide-area network (WAN)

interface 102c such as an LTE modem for connection to a wide-area network 901 such as a cellular network (for example, to enable Internet access and media streaming during travel use, such as plugged into an automobile entertainment console, or for use as a cellular modem or hotspot, or to enable interaction with connected IoT devices 140a-n from outside the local network), and personal area network (PAN) interface 102n configured for connecting to a plurality of network-capable internet-of-thing (IoT) devices 920a-n across short distances using low-power communications, such as ZigBee, Z-WAVE™, or INSTEON™ (for example). PAN interface 102n may be directed by a PAN controller 910, for example a ZigBee Coordinator that may form the root of a ZigBee network of IoT devices 920a-n. In a ZigBee network, multiple devices 920a-n may be controlled by a single ZigBee Coordinator, which functions as the root node for the network structure. Each of a plurality of additional devices 920a-n may operate as a ZigBee Router or a ZigBee End Device, according to their function or position in the network structure. A ZigBee Router may act as an intermediate router between the Coordinator and a plurality of additional End Devices, relaying communication to extend the network (ZigBee direct communication is generally limited to 10 to 20 meters) or to provide logical organization to devices in the network (such as having a router for a particular type of device, or a particular physical area). In this manner, PAN controller 910 may operate as an IoT hub, removing the need for a separate device to manage IoT devices and protocols and providing native connectivity to a variety of protocols and technologies while managing their functions and operation.

PAN communication methods may be used to enable connections to a plurality of IoT devices 920a-n, such as including (but not limited to) smart home hubs, light bulbs or switches, power outlets, or connected appliances. According to the nature of specific devices or communication methods, devices may connect to one another to form a mesh network and overcome communication limitations (for example, ZigBee generally has an operating range of 10 to 20 meters, which may not cover all connected devices in a building or other environment) or to use a central hub device such as home automation hubs produced by SMARTTHINGS™ or similar, to connect multiple devices with varying capabilities and expose their respective functionalities via a single unified connection. In this manner, a media computing device 110 may connect to a hub or other device 920a and communicate via that device to additional connected devices 920n, enabling connectivity and operation across a wide range and variety of communication protocols. Additionally, by utilizing a WAN interface 102b, some arrangements may provide interaction with connected IoT devices 920a-n from outside the local network, for example so that a user may configure or manually direct devices while they are away from their home or office. For example, a user may be able to adjust their connected thermostat or air conditioning device so that when they return home their house will already be at their preferred temperature, or they may activate a connected camera to check on their home's security, or they may receive notifications from devices such as security devices or environment sensors. This further removes the need for extraneous devices by enabling a media computing device 110 to function not only as an IoT hub but also as a cellular modem, acting as a bridge between the user's local network and the Internet for remote access and additional functionality. For example, another function that may be provided via a WAN 901 may be streaming media from external sources such as YOUTUBE™ or other media providers, enabling a user to connect to the Internet and utilize these services while traveling or when no local network may be available. This may also be used as a redundancy failsafe, for example if a local connection is experiencing difficulties such as network congestion or a hardware failure. In such a situation, a WAN interface 102b may connect directly to WAN 901 so that operation may continue uninterrupted until the LAN 102a connectivity is restored.

By connecting via wireless interfaces 102a-n to IoT devices 920a-n, a media computing device 110 may interact with and direct the operation of such devices either automatically or based on received user input (such as from a mobile device 120a-n). For example, during video playback a plurality of IoT lights 920a-n (such as network-connected LED bulbs or light switches controlling non-connected traditional light bulbs) may be directed to alter their intensity or color based on the video frames being shown, to enhance the viewing experience or to reduce eyestrain. In another example, a user interacting with media computing device 110 via their mobile device 120a-n may manually control the operation of available IoT devices 920a-n via the media computing device 110, without the need for an external software application or control interface. In this manner, media computing device 110 may function as an IoT hub device, connecting a variety of IoT devices 920a-n and directing their operation or presenting their functions and information in a unified manner.

Detailed Description of Exemplary Embodiments

Figure 3:
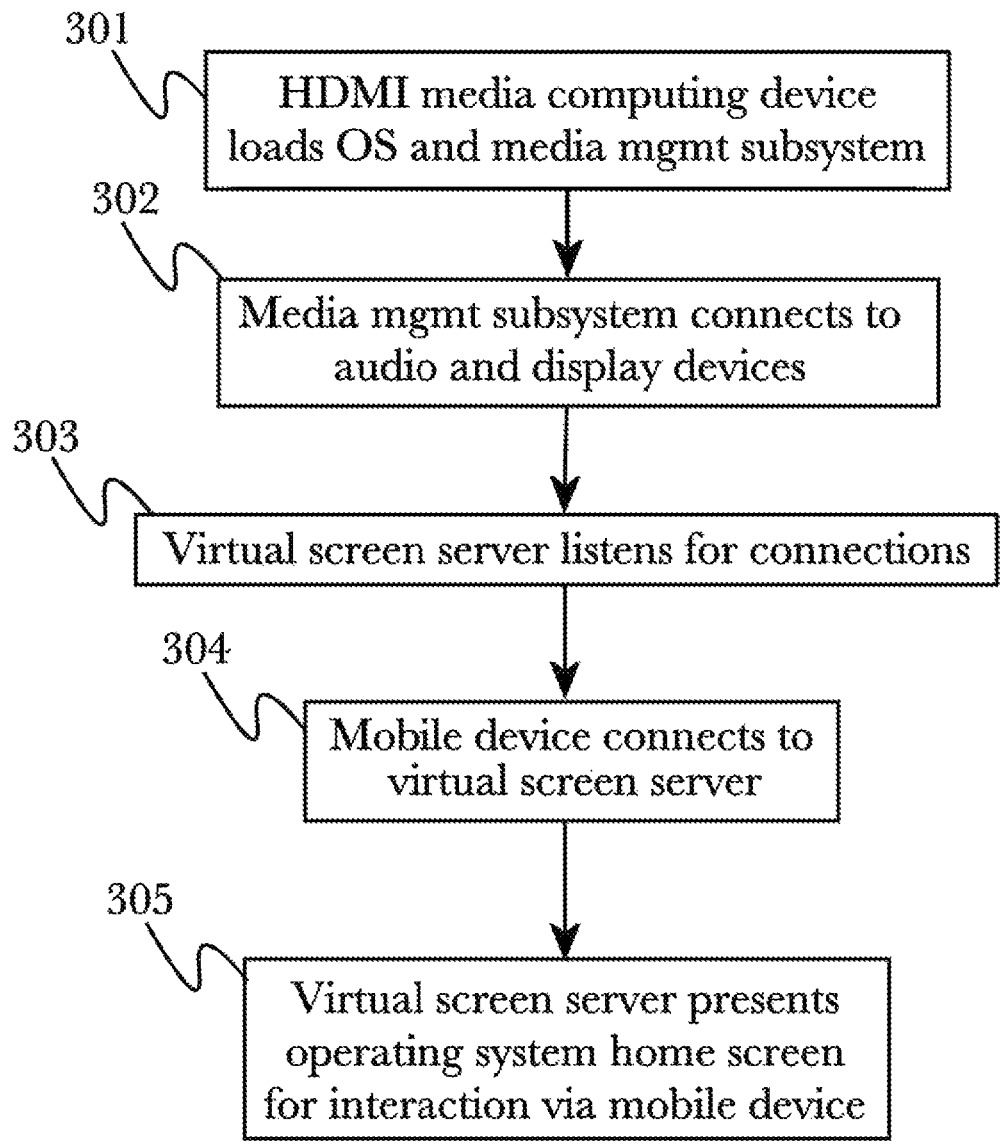
FIG. 3 is a flow diagram illustrating an exemplary method for one-to-many multimedia streaming and remote screen sharing, according to a preferred embodiment of the invention.

FIG. 3 is a flow diagram illustrating an exemplary method 300 for one-to-many multimedia streaming and remote screen sharing, according to a preferred embodiment of the invention. In an initial step 301, a media computing device 110 may load a software operating system 116 from a memory 11, and may begin operating a media management subsystem 117 and virtual screen driver 118. In a next step 302, the media management subsystem 117 may connect to a plurality of external display 130a-n or audio 201a-n devices via available connectivity means, according to the hardware capabilities of the devices or media computing device 110. In a next step 303, virtual screen driver 118 begins listening for connections via available connectivity means.

In a next step 304, a mobile device 120a-n such as a smartphone or tablet may connect to virtual screen driver 118, such as via a WiFi network or a BLUETOOTH™ or physical direct connection. In a next step 305, virtual screen driver 118 may present a home screen for the operating system to a connected mobile device for interaction.

Figure 10:
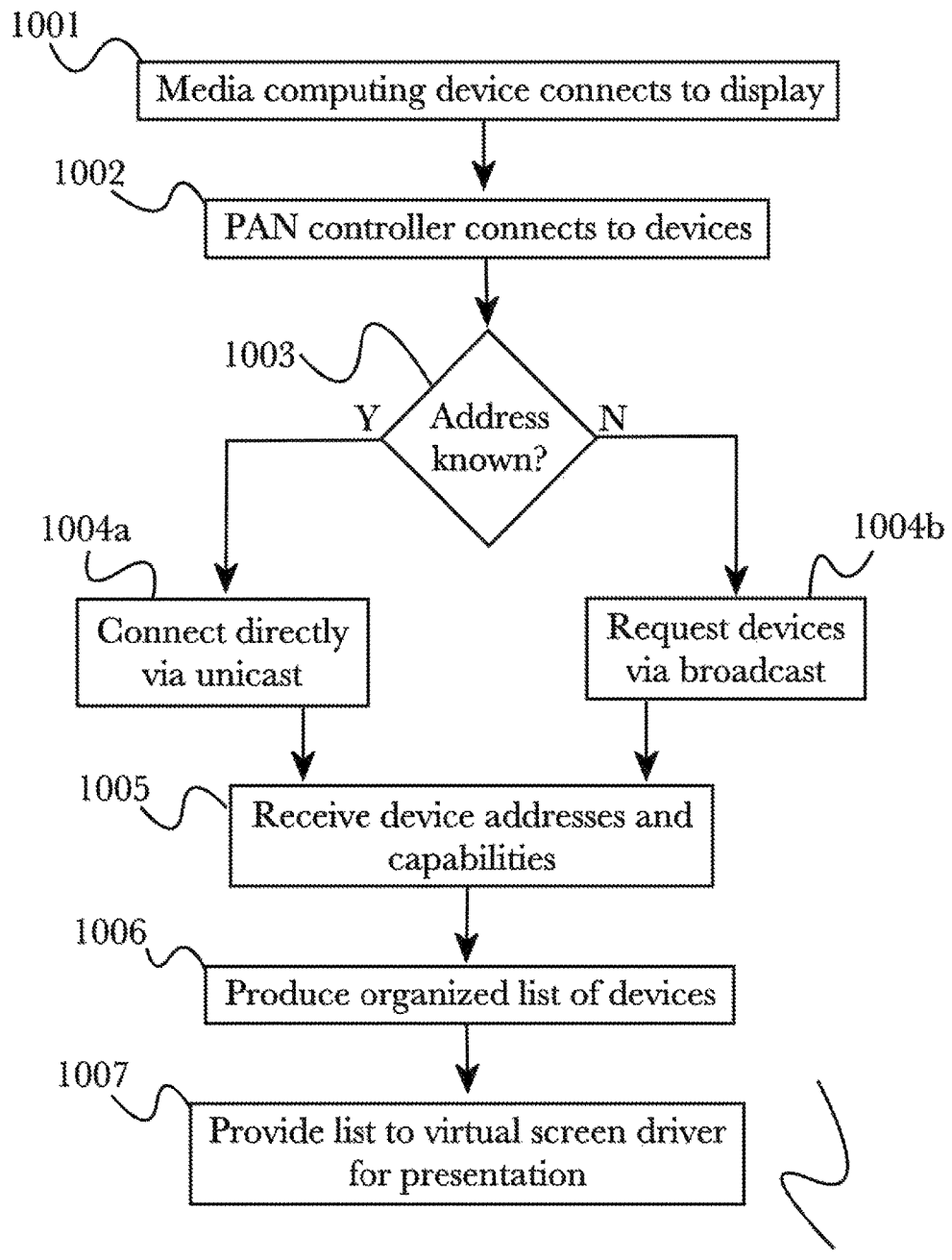
FIG. 10 is a flow diagram illustrating an exemplary method for utilizing a PAN controller to operate a media computing device with multiple virtual screens and personal area network capability as a home automation hub, according to a preferred embodiment of the invention

FIG. 10 is a flow diagram illustrating an exemplary method 1000 for utilizing a PAN controller to operate a media computing device with multiple virtual screens and personal area network capability as a home automation hub, according to a preferred embodiment of the invention. In an initial step 1001, a media computing device 110 connects to a display device 130 and begins drawing power for operation. In a next step 1002, a PAN controller 910 operating on media computing device 110 may begin operation by connecting to IoT device over a personal area network. In a next step 1003, PAN controller 910 checks for known network addresses for devices, and for any known devices it may connect directly using a unicast protocol 1004a to immediately connect to the device and begin collecting information. PAN controller 910 may also request address information and connections from any additional devices available on the network using a broadcast protocol 1004b, receiving device address information as a response from any available devices. In a next step 1005, PAN controller 910 receives device network addresses to maintain connections as well as device capabilities for configuring operation and presentation of devices to a user. Using the collected information, PAN controller 910 may then produce an organized list of connected devices 1006, and provide this list to a virtual screen driver 118 operating on media computing device 110 for presentation to a user via a virtual screen presented on their device for interaction (as described above, referring to FIGS. 1-3).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
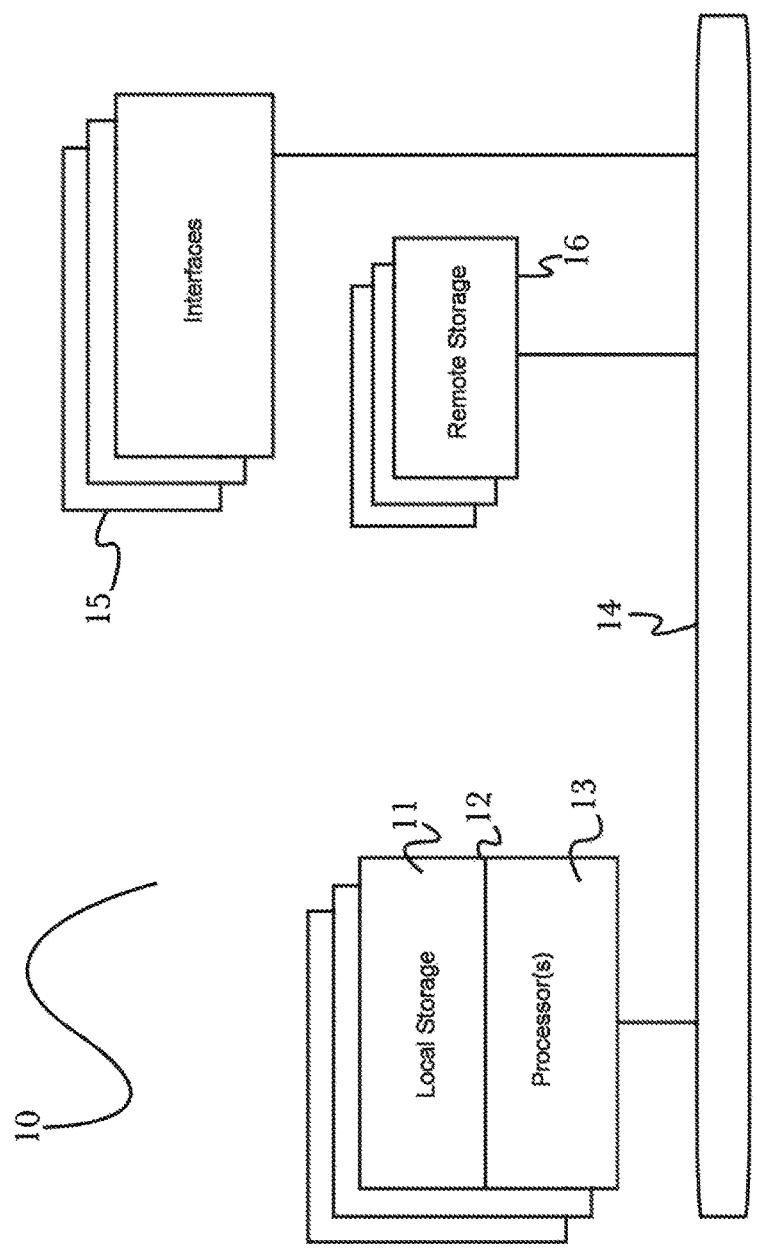
FIG. 4 is a block diagram illustrating an exemplary hardware architecture of a computing device used in an embodiment of the invention.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
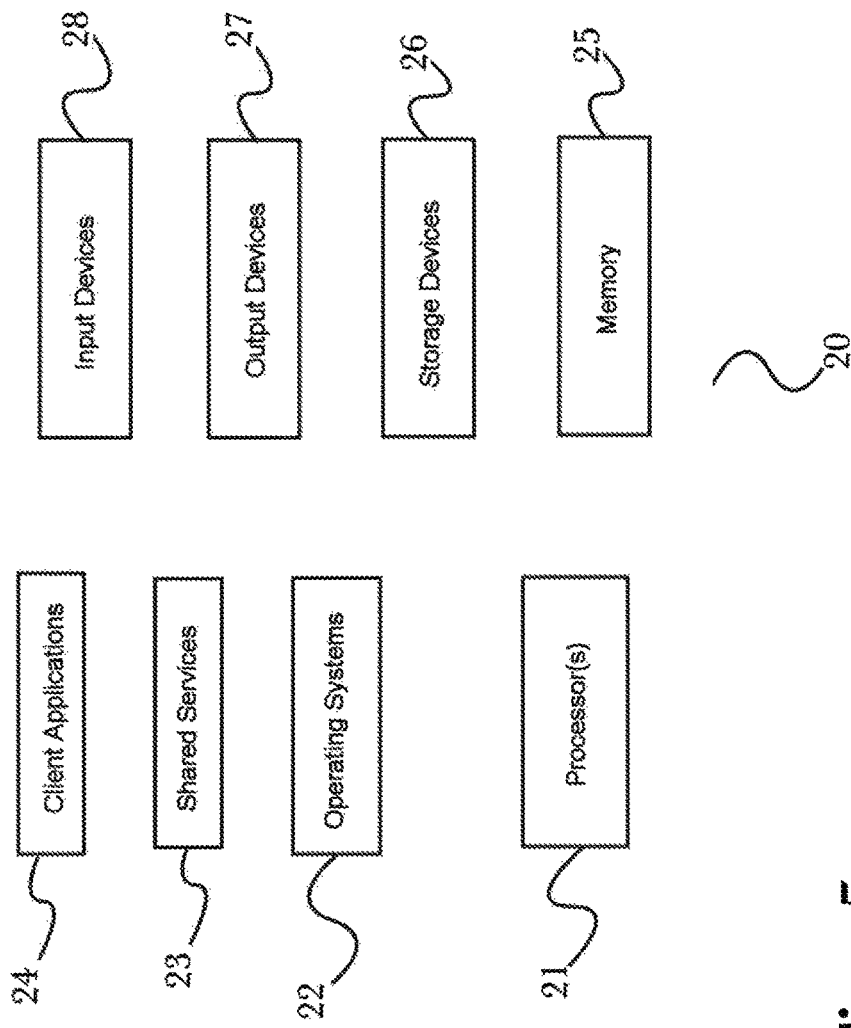
FIG. 5 is a block diagram illustrating an exemplary logical architecture for a client device, according to an embodiment of the invention.

In some embodiments, systems according to the present invention may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
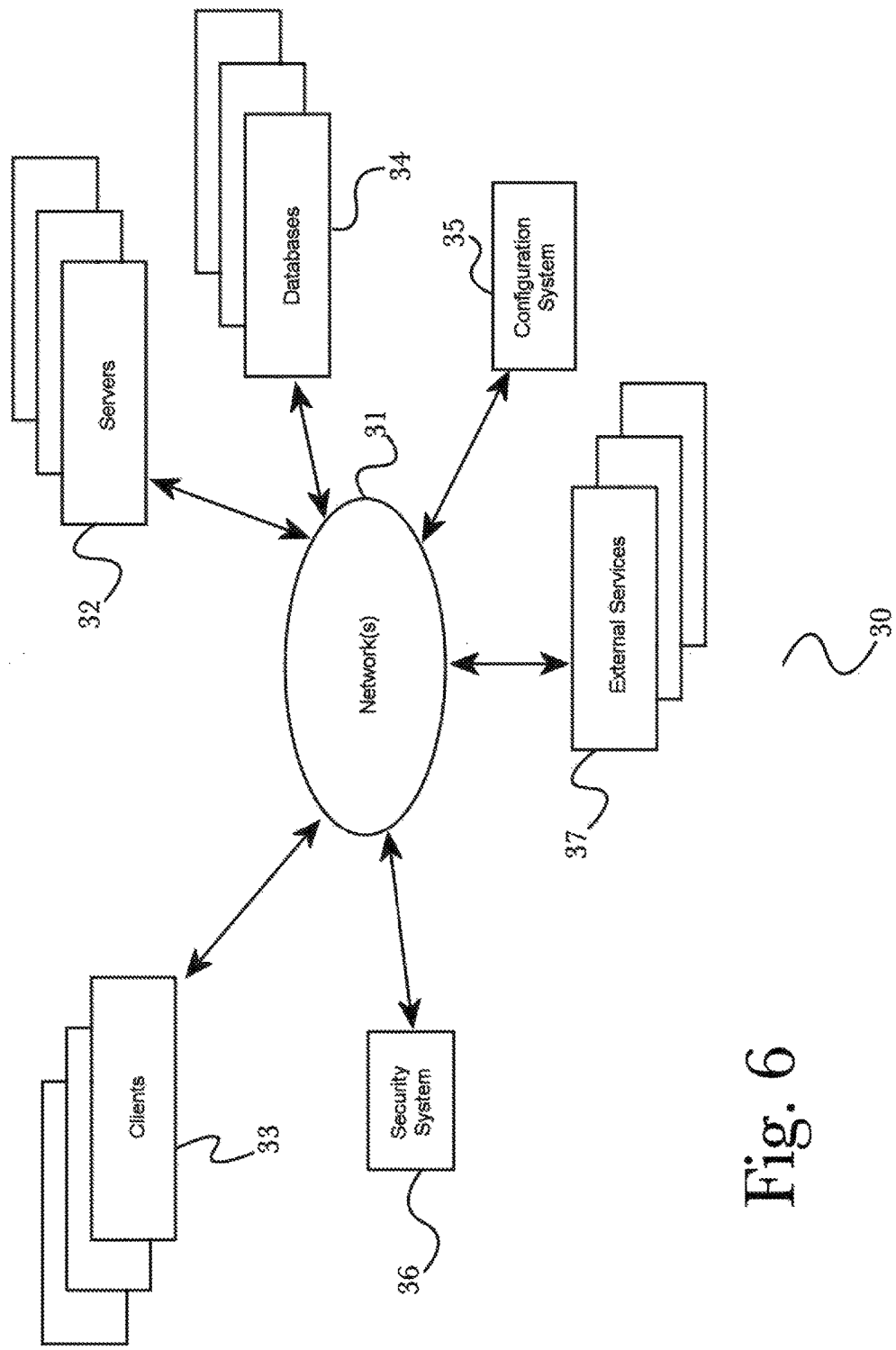
FIG. 6 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 6, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 7:
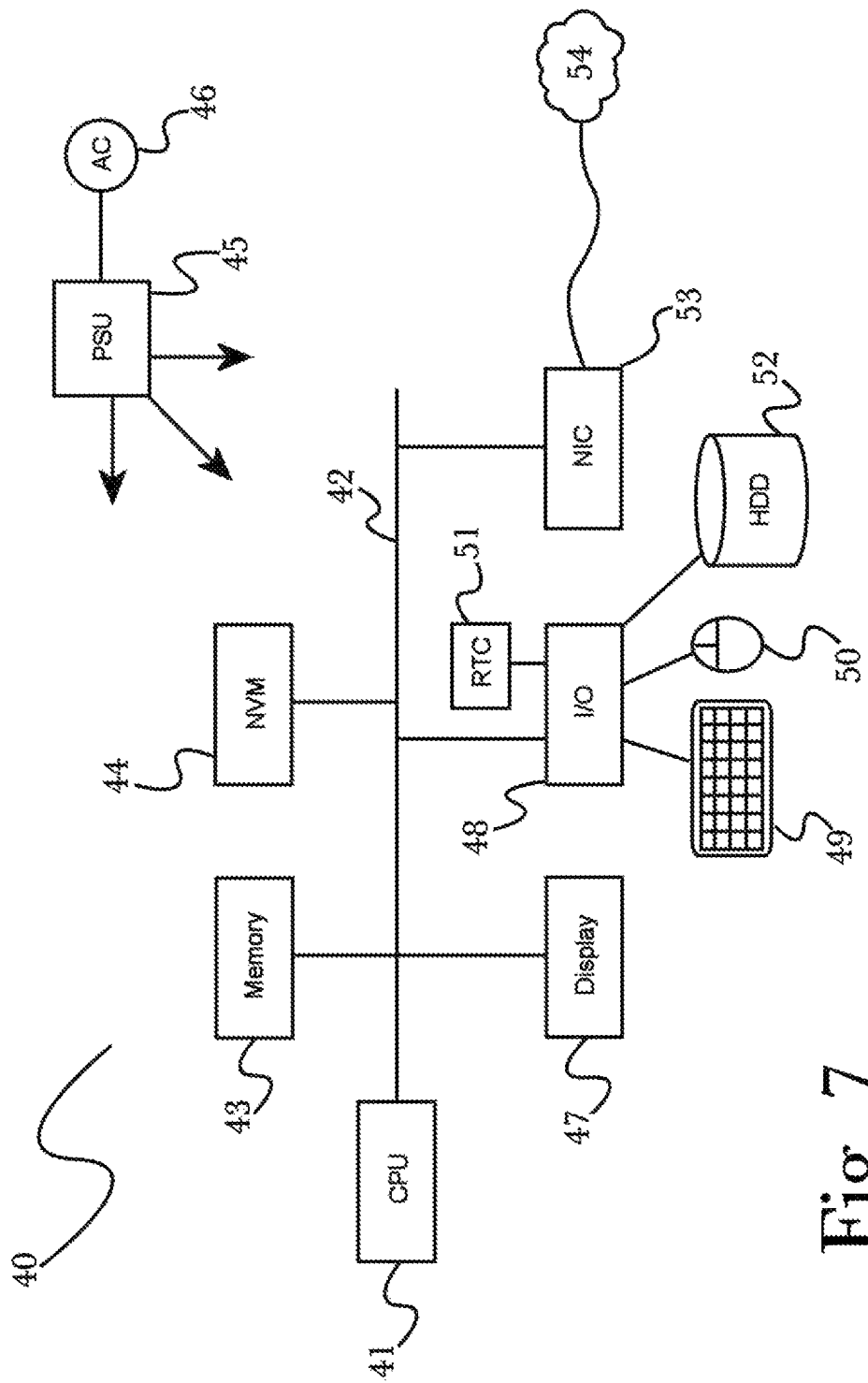
FIG. 7 is another block diagram illustrating an exemplary hardware architecture of a computing device used in various embodiments of the invention.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A media computing device with multiple virtual screens, comprising:
   a processor;
   a memory;
   a high definition media controller operating a high definition media interface;
   a plurality of wireless network interfaces, comprising at least a wireless network interface configured to communicate via a local area network;
   a media management subsystem;
   a virtual screen driver; and
   an operating system comprising programming instructions stored in the memory and operating on the processor and configured to:
      send screen graphics using the virtual screen driver to two or more mobile devices, providing thereby a complete, independent logical operating system interface to each mobile device, wherein the screen graphics comprise at least an interface for an application operating on the processor of the media computing device such that each of the two or more mobile devices interacts with the application simultaneously within an independent operating system interface;
      send media content to a high definition media display device via the high definition media controller and the high definition media interface; and
      receive user interaction events from each of the two or more mobile device via the wireless network interface;
   wherein the high definition media interface is physically coupled by insertion into a high definition media input port of the high definition media display device.

2. The device of claim 1, further comprising a wireless network interface configured to communicate via a personal area network.

3. The device of claim 2, wherein the personal area network comprises a ZIGBEE™ connection.

4. The device of claim 2, wherein the personal area network communication comprises a Z-WAVE™ connection.

5. The device of claim 2, wherein the personal area network communication comprises an INSTEON™ connection.

6. A media computing device, comprising:
a processor;
a memory;
a high-definition multimedia interface adapter;
a wireless network interface configured to communicate via a wireless network;
a media management subsystem;
a virtual screen driver; and
an operating system comprising programming instructions stored in the memory and operating on the processor and configured to:
send screen graphics using the virtual screen driver to two or more mobile devices using the wireless network, providing thereby a complete, independent logical operating system interface to each mobile device, wherein the screen graphics comprise at least an interface for an application operating on the processor of the media computing device such that each of the two or more mobile devices interacts with the application simultaneously within an independent operating system interface;
send media content to a display device via the high-definition multimedia interface adapter; and
receive user interaction events from a mobile device via the wireless network interface.

7. The device of claim 6, further comprising a wireless network interface configured to communicate via a personal area network.

8. The device of claim 7, wherein the personal area network comprises a ZIGBEE™ connection.

9. The device of claim 7, wherein the personal area network communication comprises a Z-WAVE™ connection.

10. The device of claim 7, wherein the personal area network communication comprises an INSTEON™ connection.

11. A media computing device, comprising:
a processor;
a memory;
a high definition media controller operating a high definition media interface;
a plurality of wireless network interfaces, comprising at least a wireless network interface configured to communicate via a local area network;
a virtual screen driver; and
an operating system comprising programming instructions stored in the memory and operating on the processor and configured to:
send screen graphics using the virtual screen driver to two or more mobile devices, providing thereby a complete, independent logical operating system interface to each mobile device, wherein the screen graphics comprise at least an interface for an application operating on the processor of the media computing device such that each of the two or more mobile devices interacts with the application simultaneously within an independent operating system interface;
send media content to a high definition media display device via the high definition media controller and the high definition media interface; and
receive user interaction events from a mobile device via the wireless network interface.

* * * * *